United States Patent
Keller et al.

(10) Patent No.: US 11,804,034 B2
(45) Date of Patent: Oct. 31, 2023

(54) TRAINING A FUNCTION TO RESPOND PREDICTABLY TO DIFFERENCES

(71) Applicant: Robert Bosch GmbH, Stuttgart (DE)

(72) Inventors: Thomas Andy Keller, Amsterdam (NL); Anna Khoreva, Stuttgart (DE); Max Welling, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 265 days.

(21) Appl. No.: 17/233,024

(22) Filed: Apr. 16, 2021

(65) Prior Publication Data
US 2021/0350182 A1    Nov. 11, 2021

(30) Foreign Application Priority Data

May 8, 2020    (EP) ..................................... 20173742

(51) Int. Cl.
*G06V 10/82* (2022.01)
*G06N 3/04* (2023.01)
(Continued)

(52) U.S. Cl.
CPC .......... *G06V 10/82* (2022.01); *G06F 18/2155* (2023.01); *G06F 18/24* (2023.01);
(Continued)

(58) Field of Classification Search
CPC ...... G06V 10/82; G06V 10/776; G06V 20/56; G06F 18/24; G06F 18/2155; G06N 3/04; G06N 3/08
See application file for complete search history.

(56) References Cited

U.S. PATENT DOCUMENTS

| | | | |
|---|---|---|---|
| 10,902,311 B2 * | 1/2021 | Dasgupta | G06N 3/044 |
| 2019/0147335 A1 * | 5/2019 | Wang | G06V 10/803 |
| | | | 706/20 |

(Continued)

FOREIGN PATENT DOCUMENTS

EP    3627391 A1    3/2020

OTHER PUBLICATIONS

Kamran Ghasedi Dizaji et al., "Balanced Self-Paced Learning for Generative Adversarial Clustering Network," IEEE/CVF Conference on Computer Vision and Pattern Recognition (CVPR), 2019, pp. 4386-4395.

(Continued)

*Primary Examiner* — Utpal D Shah
(74) *Attorney, Agent, or Firm* — NORTON ROSE FULBRIGHT US LLP; Gerard Messina (57) ABSTRACT

A computer-implemented method of training a machine learnable function, such as an image classifier or image feature extractor. When applying such machine learnable functions in autonomous driving and similar application areas, generalizability may be important. To improve generalizability, the machine learnable function is rewarded for responding predictably at a layer of the machine learnable function to a set of differences between input observations. This is done by means of a regularization objective included in the objective function used to train the machine learnable function. The regularization objective rewards a mutual statistical dependence between representations of input observations at the given layer, given a difference label indicating a difference between the input observations.

13 Claims, 5 Drawing Sheets

(51) Int. Cl.
  *G06N 3/08* (2023.01)
  *G06V 10/776* (2022.01)
  *G06V 20/56* (2022.01)
  *G06F 18/214* (2023.01)
  *G06F 18/24* (2023.01)
  *G06V 10/764* (2022.01)
  *G06V 20/70* (2022.01)

(52) U.S. Cl.
  CPC .............. *G06N 3/04* (2013.01); *G06N 3/08* (2013.01); *G06V 10/764* (2022.01); *G06V 10/776* (2022.01); *G06V 20/56* (2022.01); *G06V 20/70* (2022.01)

(56) References Cited

U.S. PATENT DOCUMENTS

2021/0287099 A1* 9/2021 Mroueh ................ G06N 3/047
2022/0036187 A1* 2/2022 Wei ...................... G06N 3/08
2022/0207300 A1* 6/2022 Rho .................. G06F 18/2148

OTHER PUBLICATIONS

Cohen et al., "Group Equivariant Convolutional Networks," Cornell University, 2016, pages 1-12. <https://aixiv.org/pdf/1602.07576.pdf> Downloaded Apr. 15, 2021.
Kingma et al., "ADAM: A Method for Stochastic Optimization," Cornell University, 2017, pp. 1-15. <https://arxiv.org/pdf/1412.6980.pdf> Downloaded Apr. 15, 2021.
Belghazi et al., "MINE: Mutual Information Neural Estimation," Cornell University, 2018, pp. 1-18. <https://arxiv.org/pdf/1801.04062.pdf> Downloaded Apr. 15, 2021.
Caron et al., "Deep Clustering for Unsupervised Learning of Visual Features," Cornell University, 2019, pp. 1-30. <https://arxiv.org/pdf/1807.05520.pdf> Downloaded Apr. 15, 2021.

* cited by examiner

TRAINING A FUNCTION TO RESPOND PREDICTABLY TO DIFFERENCES

CROSS REFERENCE

The present application claims the benefit under 35 U.S.C. § 119 of European Patent Application No. EP 20173742.6 filed on May 8, 2020, which is expressly incorporated herein by reference in its entirety.

FIELD

The present invention relates to a computer-implemented method of training a machine learnable function, and to a corresponding system. The present invention further relates to a computer-readable medium comprising instructions and/or function parameters.

BACKGROUND INFORMATION

Machine learnable functions have the potential to perform tasks much more accurately than manually designed algorithms. For example, machine learnable functions, e.g., based on convolutional neural networks or similar techniques, have been shown to be able to achieve good degrees of accuracy for various image classification tasks, such as recognizing digits, distinguishing between cats and dogs, etcetera. Typically, such a machine learnable function is trained on a training dataset, e.g., comprising images labelled with their desired classifications. Generally, the more training examples, the better the resulting accuracy of the trained function.

In many practical situations, the feasibility of obtaining training data that covers a sufficiently wide range of inputs, is a main obstacle hindering the practical adoption of machine learning solutions. For example, in the area of (semi-)autonomous vehicles, machine learnable functions have the potential to carry out various tasks that are needed for controlling or monitoring the vehicle, e.g., image analysis of camera images of the environment of the vehicle, e.g., to warn for dangerous traffic situations. However, obtaining training data for such tasks requires driving around in the vehicle; this is expensive and can even be dangerous. Moreover, images of a vehicle's environment can vary in many different ways, e.g., in terms of the general configuration of the scene (whether there is another car in front, whether there are pedestrians nearby, etc.) but also in terms of many other aspects (e.g., the type of road that the car is driving on; the way traffic signs look like, which differs from country to country; the weather conditions; etc.).

This makes it almost impossible to obtain a training dataset that covers all possible combinations of situations, in particular corner cases, that the vehicle may encounter. On the other hand, especially when used to make automated driving decisions, it is crucial for machine learnable functions to deal reliably especially with such corner cases. Accordingly, it is desirable to use functions with a high degree of generalizability, e.g., that provide accurate results also on inputs that were not directly covered in the training dataset.

One machine learning technique that helps generalizability, are so-called group equivariant convolutional networks, e.g., as described in "Group Equivariant Convolutional Networks" by T. Cohen et al. (incorporated by reference herein and available at https://arxiv.org/abs/1602.07576). A group equivariant convolutional network is a deep neural network, i.e., a function that processes an input, in this case an image, by passing it through multiple respective parameterized layers. In a group equivariant convolutional network, representations at these respective layers are modelled as linear G-spaces, where G is a predefined mathematical group (i.e., a set with a binary operation satisfying closure, associativity, identity, and invertibility) representing a set of transformations that can be applied. Equivariance means that, given transformations $T_g$ on the layer inputs and $T_g'$ on the layer outputs, where $g \in G$, the identity $\Phi(T_g x) = T_g' \Phi(x)$ holds. For example, rotating or mirroring an input should lead to a corresponding rotation of the output. This additional structure given to neural network layers allows data to be modelled more efficiently and improves generalizability, essentially because knowledge about desired function outputs can be shared between inputs and their transformed variants.

Unfortunately, existing techniques to make functions equivariant have several disadvantages. Complex analytic formulations of the group of transformations G are needed, and additionally, these transformations must be known ahead of time and hard-coded into the model architecture. Also when using the function, the group of transformations is used, making the model architecture dependent on the type of transformations used in training and thereby incompatible with standard tools for applying machine learning techniques, e.g., standard implementations of convolutional neural networks. The transformations also need to conform to the group axioms of the group of transformations G. Accordingly, only a restricted set of (geometric-type) transformations can be specified.

SUMMARY

It would be desirable to train a machine learnable function, for example an image classifier or image feature extractor, such that generalizability is improved, but without the need to integrate transformations into the model architecture. In particular, it would be desirable to reward predictability of variations of inputs observations that do not behave according to a mathematical group structure. It would also be desirable to improve generalizability of machine learnable functions without affecting their model architecture, e.g., such that the trained function is a standard convolutional neural network or the like.

In accordance with an aspect of the present invention, a computer-implemented method and a corresponding system are provided for training a machine learnable function. In accordance with an aspect of the present invention, a computer-readable medium is provided.

Various aspects of the present invention relate to training a machine learnable function (in other words, learning the set of parameters parameterizing the machine learnable function) by optimizing an objective function. Many types of machine learnable functions, and objective functions suitable for training them, are conventional. For example, the learning task can be classification or regression. The training may be supervised, e.g., based on a labelled dataset of training input observations and corresponding training outputs, the objective function being configured to minimize a difference between function outputs of the machine learnable function and corresponding training outputs. The training can also be unsupervised, e.g., learning of a feature extractor (feature extraction is also known as representation learning). In either case, conventional objective functions can be used.

Interestingly, to improve generalizability, the machine learnable function may be rewarded for responding predictably at a layer of the machine learnable function to a set of differences between input observations. This is analogous to group-equivariant convolutional neural networks, which enforce that applying a given G-action to an input observation results in applying a corresponding G-action to an output of a layer. Interestingly, however, the inventors envisaged to reward predictability not by hardcoding a particular set of transformations into the model architecture, but by including a regularization objective in the objective function that is used to train the machine learnable function. For example, a regularization objective decreasing in a degree of predictability may be included in a loss function to be minimized, or a regularization objective increasing in a degree of predictability may be included in an objective function to be maximized.

In particular, the objective function may be based on pairs of first and second input observations, and on difference labels indicating differences between these first and second observations. For example, the first and second observations may be images of generally corresponding scenes, e.g., both may be environments of a vehicle in which the vehicle is stopping for a traffic light. The difference label may single out a particular difference between the first and second observations, e.g., in terms of weather conditions; the type of vehicle in front of the vehicle; the country in which the image was obtained (and according, the type of traffic lights and/or traffic signs present); etcetera.

Preferably, the pairs of observations are selected such that, apart from the difference indicated by the difference label, they correspond to each other as much as possible.

In particular, the difference label may represent a transformation according to which the second observation may be obtained (at least approximately) from the first observation. Accordingly, swapping the first and second observation typically also leads to another difference label.

Interestingly, however, the set of differences from which the difference label is selected does not need to have any particular mathematical structure, in particular, it does not need to be a group in the mathematical sense.

To evaluate a regularization objective for encouraging predictability at a certain layer, the machine learnable function may be applied to first and second observations to obtain respective representations at that layer. The regularization objective may then reward predictability by encouraging a mutual statistical dependence between these representations given their difference label. In other words, given the difference label, an amount of information that one representation provides about the other representation, may be maximized by the objective function. Such a mutual statistical dependence can for example be computed in terms of conditional mutual information or interaction information, as discussed in more detail below.

By encouraging mutual statistical dependence of the representations given the difference label, a regularizer is obtained that improves the generalizability and robustness of the trained function. Namely, the function is effectively rewarded to learn how a difference between a pair of input observations affects the function output. Accordingly, if the same difference also applies to an unseen observation, the function is able to better deal with this difference.

In terms of the achieved result, this is analogous to the improved generalizability provided by group-equivariant convolutional networks, and indeed, the inventors were able to show that group-equivariant convolutional networks provided an optimum for the regularization objective when phrased in terms of conditional mutual information. Interestingly, however, the provided techniques provide much more flexibility than group-equivariant convolutional networks, leading to several practical advantages.

By using a difference based on a mutual statistical dependence, a measure is obtained that is applicable to a broad set of differences, e.g., no particular mathematical group structure needs to be assumed. This allows to capture various types of differences that occur in practical situations, e.g., difference in weather conditions, in country where the observation took place, etc. It is also not needed to explicitly define how a difference transforms one input to the other: it is sufficient to have pairs of input observations and an accompanying difference label, and even the difference label can be learned from the data. It is also not needed for the pair to differ exactly and only according to the difference type, e.g., there may be other differences between the observations (although training is more effective if there is a closer correspondence). For the representations to which the regularization objective is applied, no transformations need to be given as input at all, and accordingly, the function can itself learn an optimal way of representing inputs.

Moreover, inclusion in the objective function allows to balance predictability against other training objectives. Effectively, mutual statistical dependence may be regarded as a continuum between unpredictability and predictability. Because the regularization term is typically weighed against other terms of the objective function, the function itself can automatically arrive at an amount of statistical dependence that is appropriate for the learning task at hand, instead of being forced to rigorously enforce equivariance no matter what. This also improves the applicability of the function to situations where enforcing equivariance too rigorously would degrade performance.

Another advantage of encouraging predictability by adapting the objective function (e.g., instead of the model architecture), is that a trained function can be obtained of which the architecture does not depend on the type of differences considered during training, e.g., the hardware/software used to apply the trained function does not need to depend on or support various kinds of transformations providing such differences. Thus, compatibility with conventional software/hardware for applying machine learning functions, e.g., convolutional neural network evaluation software/hardware, is improved.

Several choices are possible concerning the layer to which the regularization objective is applied. Regardless of the type of machine learnable function, the objective may be applied at the output layer. This also applies if the machine learnable function does not otherwise follow a layered structure, e.g., also to non-neural networks. The output layer is a particularly good choice if the machine learnable function is a feature extractor, e.g., an image feature extractor, since in this case, the predictability provided by the regularization objective can then be fully used by other components using it. For machine learnable functions that have internal layers, such as neural networks and deep Gaussian processes, it is possible, instead or in addition, to apply the regularization objective to an internal layer of the function, or to apply respective regularization objectives to multiple respective internal layers. Beneficial choices for the machine learnable function and/or layers to regularize are discussed throughout.

In accordance with an example embodiment of the present invention, optionally, the machine learnable function may be an image classifier or an image feature extractor. Such image processing models in particular have to deal with the problem of input variation, and thus benefit especially from having improved generalizability. Generally, an image classifier may map an input image to one or more classification outputs. For example, the image classifier may be a detection model, e.g., a function providing a classification output indicating whether or not an object is present in the entire image or in a segment of the image. The image classifier can also be a semantic segmentation model, e.g., a function providing multiple classification outputs indicating presence of objects in respective pixels or segments of the image. An image feature extractor may map an input image to a vector of image features, for example, for use in classification or other downstream applications. Using the described training techniques, more effective and robust image processing models can be obtained.

In accordance with an example embodiment of the present invention, optionally, the machine learnable function may be an image feature extractor for use in an overall image classifier. In this case, it is possible to train the image feature on an unlabeled training dataset (i.e., the training does not use any available classification labels), and then to train the overall image classifier on a labelled training dataset. The labelled dataset can for example be a subset of the unlabeled training dataset for which labels are available, or can be a separate dataset. Typically, unlabeled data is much easier to obtain than labelled data. By separating the training of the feature extractor from the training of the classifier, data without labels can be used to train the feature extractor. When separately training the feature extractor, it is especially important to learn generalizable features, and thus, the provided regularization objective is beneficial. The regularization objective is in this example typically applied to the output layer of the feature extractor. When training the classifier, also the feature extractor may be fine-tuned (which may or may not include using the regularization objective), but this is not necessary.

In accordance with an example embodiment of the present invention, optionally, the objective function may comprise multiple respective regularization objectives for multiple respective layers of the machine learnable function. Different layers of a function, such as a neural network, tend to represent input observations at different levels of abstraction. By applying regularization objectives at several layers, generalizability at several layers levels of abstraction can thus be rewarded. For example, during training, at each layer, the regularization objective may be included and removed from the objective function to see whether it has a beneficial effect at that layer.

In accordance with an example embodiment of the present invention, optionally, the first and second input observations are images representing a same type of scene, e.g., scenes comprising similar objects or similar configurations of multiple objects. For example, both images may represent an environment of a vehicle, for example, for use in a vision model for a (semi-)autonomous vehicle. For example, both images in a pair may represent a scene where the vehicle is cruising on the highway, where it is stopping for a traffic light, where a pedestrian is unexpectedly crossing the road; etcetera. However, other application areas in which robustness to transformation areas is needed, are also possible.

In such cases, a difference label may indicate a difference in a property of an object in the scene, or the scene itself (e.g., a brand of car; a type of car; whether cars should keep left or keep right; or a country in which the image was captured, which may be regarded as a proxy for several scene properties). A difference label can also indicate a difference in observation conditions of the scene, for example, a difference in weather conditions; in occlusion level of an object captured by the image; in position or orientation of an object in the image; etcetera. By including a regularization objective with respect to such semantically meaningful differences, the function may be rewarded to reason about these differences and their effect on function outputs, resulting in a function that generalizes better with respect to these differences.

In accordance with an example embodiment of the present invention, optionally, the machine learnable function may be a convolutional network. Convolutional networks, also known as convolutional neural networks (CNNs), have proven to be effective for various learning tasks, particularly image analysis. Their respective layers typically represent an input observation at respective levels of abstraction. By selecting internal layers of a CNN, various kinds of differences between input observations can be appropriately taken into account in a regularization objective.

In accordance with an example embodiment of the present invention, optionally, evaluating the regularization objective may comprise estimating a mutual information between the first and second representations given the difference label. This so-called conditional mutual information provides a suitable, information-theoretically motivated way of determining mutual statistic dependence between representations of input observations. However, also other mutual informations with respect to these three variables may be estimated, such as the mutual information between the first representation and the difference label given the second representation, or the mutual information between the second representation and the difference label given the first representation. For example, the regularization objective may include an interaction information, as also described below, that may be based on these mutual informations. Instead of using mutual information-based measures, also other measures of mutual statistical dependence, e.g., conditional entropy of the second observation given the first representation and the difference label, or variation of information, are possible.

One reason why the use of (conditional) mutual information specifically is beneficial, is because it can be estimated efficiently according to a trainable mutual information estimation model. Although it is also possible to directly compute (conditional) or estimate mutual information or related quantities such as conditional entropy, the use of a trainable estimation model greatly improves performance. Interestingly, conventional mutual information estimation models can be trained simultaneously with the machine learnable function, for example, by including the learning objective for the mutual information estimation model in the objective function. This way, the function for estimating the mutual information can be progressively updated as the training of the machine learnable function progresses, instead of having to be learned from scratch every time the machine learnable function changes.

In accordance with an example embodiment of the present invention, optionally, the regularization objective may be further configured to discourage a mutual dependence between the first and second representations unconditioned on the difference label, for example, as measured by the mutual information between the first and second representations (not conditioned on the difference label). This way, the function may be discouraged to provide the same representation for both input observations, in other words, the function may be discouraged from determining a representation that is not just equivariant but even invariant. Such an invariant representation is likely to be a local optimum of the regularization objective. However, invariance may be unfavourable to the generalizability of the function since it effectively rewards the function to discard information about the labelled difference rather than learning how to respond to it in a non-trivial way. In network-structured functions, this may be due to propagation and orderly structuring of transformation information deeper into the network, which an invariant network may discard. Accordingly, by thus penalizing invariance, better generalizability may be achieved, especially in cases where there is little training data for corner cases.

Specifically, the regularization objective may comprise the difference between the mutual information conditioned on the difference label, and the mutual information unconditioned on the difference label. This difference is also known as the interaction information between the first representation, the second representation, and the difference label. It is noted that that the interaction information can also be computed without explicitly computing the abovementioned mutual informations; however, it will be appreciated that whichever way the interaction information is computed, it generally both rewards mutual statistical dependence between the first and second representations given the difference label, and discourages mutual dependence between the representations unconditioned on the difference label.

Several options are envisaged for obtaining a pair of input observations and a corresponding difference label. The first input observation typically comes from the training dataset. Optionally, given a difference label, the second input observation may be generated from the first input observation and the difference label. For example, a transformation according to the difference label may be applied, e.g., an object in an image may be partially occluded; a difference in weather conditions may be simulated, e.g., by adding snow or rain; etcetera. It is also possible to determine the difference label given the pair of observations using a machine learnable labelling function. For example, labels for some pairs of observations may be used train a labelling function for labelling other pairs, thus decreasing the labelling effort needed; or the labelling function may even be trained in an unsupervised way, so that no labels may need to be manually specified at all.

The techniques described herein in accordance with the present invention can be applied to various types of input observations. This includes images but also various other types of sensor data, including radar data, ultrasound data, LiDAR data, motion data, etc. For example, in the context of a computer-controlled system, the sensor data may provide an observation of the computer-controlled system and/or its environment. In such cases, the computer-controlled system may be monitored and/or controlled based on the output of the machine learnable function. Examples of computer-controlled systems includes robots, (semi- or fully) autonomous vehicles, domestic appliances, power tools, manufacturing machines, personal assistants, and access control systems. Systems that can be monitored include surveillances system and medical (imaging) systems, for example.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
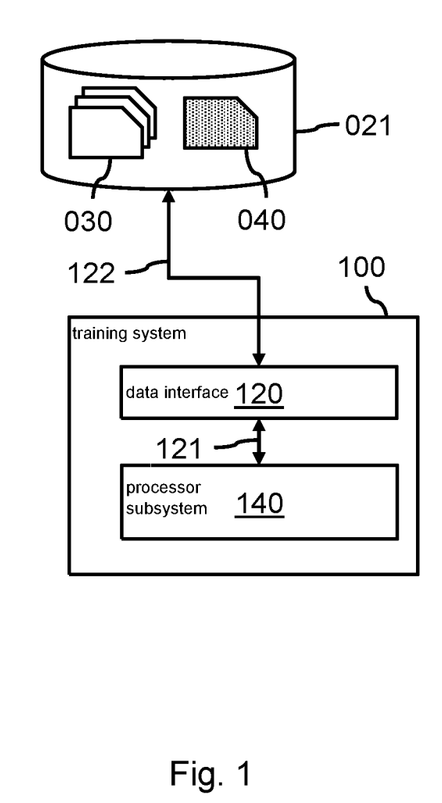
FIG. 1 shows a system for training a machine learnable function, in accordance with an example embodiment of the present invention.

FIG. 1 shows a system 100 for training a machine learnable function. The machine learnable function may map an input observation to a function output. The machine learnable function may comprise one or more internal layers and/or an output layer. The function may be trained for use by a system for applying the machine learnable function, e.g., system 200 of FIG. 2, particularly to enable monitoring and/or controlling of a computer-controlled system based on the output of the machine learnable function.

The system 100 may comprise a data interface 120. The data interface 120 may be for accessing a training dataset 030 comprising multiple training input observations. The data interface 120 may also be for accessing a set of parameters 040 of the machine learnable function being trained. Once learned, the parameters 040 may be used for applying the machine learnable function to an observation, as also discussed with respect to FIG. 2. For example, as also illustrated in FIG. 1, the data interface may be constituted by a data storage interface 120 which may access the data 030, 040, via data communication 122, from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for the data storage interface 120.

The system 100 may further comprise a processor subsystem 140 which may be configured to, during operation of the system 100, learn the set of parameters of the machine learnable function by optimizing an objective function. The optimization may comprise rewarding the machine learnable function for responding predictably at a layer of the machine learnable function (e.g., an internal layer or the output layer) to a set of differences between input observations. The optimization may reward said predictability by means of a regularization objective included in the objective function.

To perform the optimization, processor subsystem 140 may obtain: a first input observation from the training dataset; a corresponding second input observation; and a difference label from the set of differences indicating a difference between the first and second input observations. Processor subsystem 140 may further apply the machine learnable function to determine first and second representations of the first and second input observations, respectively, at the layer of the machine learnable function. Processor subsystem 140 may further evaluate the regularization objective. The regularization objective may be configured to reward a mutual statistical dependence between the first and second representations given the difference label between the first and second input observations. System 100 may output the learned set of parameters via an output interface, e.g., by updating the set of parameters in storage 021 via data interface 120, by providing the set of parameters to a third party via a communication interface, etc.

Figure 2:
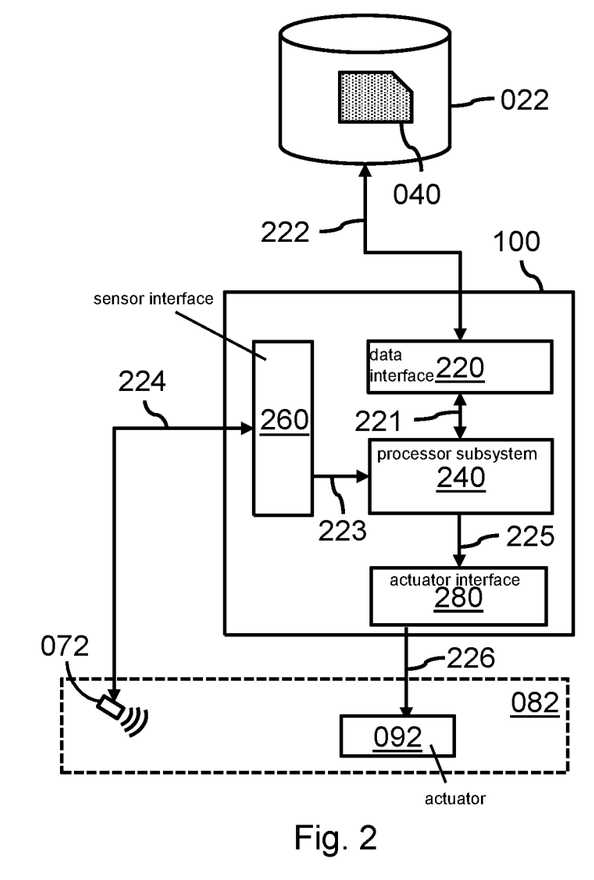
FIG. 2 shows a system for applying a machine learnable function, in accordance with an example embodiment of the present invention.
Figure 6:
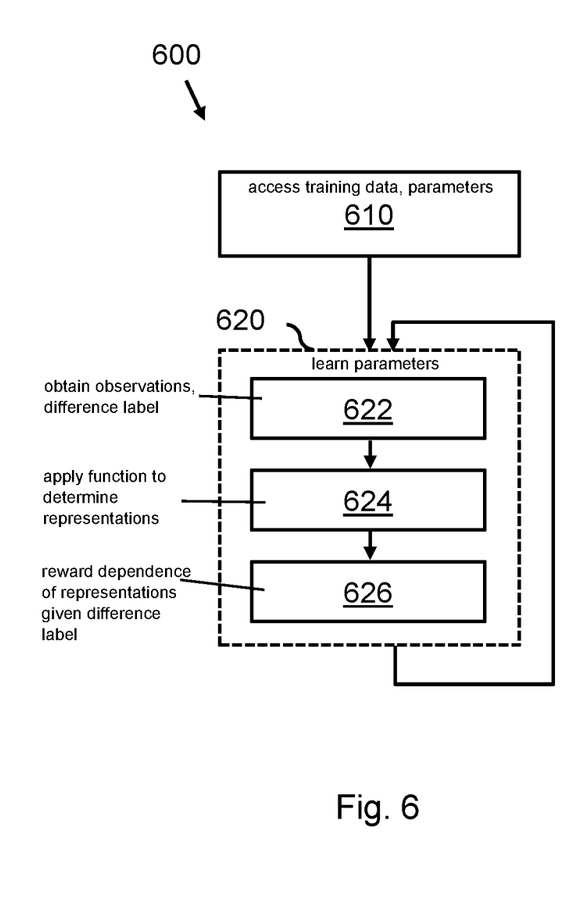
FIG. 6 shows a computer-implemented method of training a machine learnable function, in accordance with an example embodiment of the present invention.

FIG. 2 shows a system 200 for applying a machine learnable function as trained as described herein, e.g., by system 100 of FIG. 1 or according to computer-implemented method 600 of FIG. 6. For example, system 200 can be a vehicle control system, a robotics control system, a manufacturing control system, or a building control system. System 200 can also optionally perform the training, e.g., system 200 may combined with system 100.

The system 200 may comprise a data interface 220 for accessing the set of parameters 040 of the trained machine learnable function. The same considerations and implementation options apply as for data interface 120 of FIG. 1. Shown in the figure is a data interface 220 accessing parameters 040 from a storage 022 via data communication 222, similarly to storage 021 and data communication 122 of FIG. 1.

The system 200 may further comprise a processor subsystem 240 which may be configured to, during operation of the system 200, apply the machine learnable function parameterized by parameters 040 to an observation of a computer-controlled system and/or its environment. Based on the output of the machine learnable function, the computer-controlled system may be monitored and/or controlled in a conventional way. The same considerations and implementation options apply as for processor subsystem 140 of FIG. 1.

FIG. 2 further shows various optional components of the system 200. For example, in some embodiments, the system 200 may comprise a sensor interface 260 for directly accessing sensor data 224 providing an observation of the computer-controlled system and/or its environment. For example, the sensor data 224 may be acquired in the environment 082 by a sensor 072. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. The sensor interface 260 may have any suitable form corresponding in type to the type of sensor, including but not limited to a low-level communication interface, e.g., based on 120 or SPI data communication, or a data storage interface of a type as described for data interface 220.

In some embodiments of the present invention, the system 200 may comprise an actuator interface 280 for providing control data 226 to an actuator 092 in the environment 082. Such control data 226 may be generated by the processor subsystem 240 to control the actuator based on the output of the machine learnable function. The actuator can but does not have to be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments of the present invention (not shown in FIG. 2), the system 200 may comprise an output interface to a rendering device, such as a display, a light source, a loudspeaker, a vibration motor, etc., which may be used to generate a sensory perceptible output signal which may be generated based on the function output. The sensory perceptible output signal may be directly indicative of the function output, but may also represent a derived sensory perceptible output signal, e.g., for use in guidance, navigation or other type of control of the computer-controlled system.

In general, each system described in herein, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar computer-controlled system, and/or may be represent a control system configured to control such a system.

Figure 3:
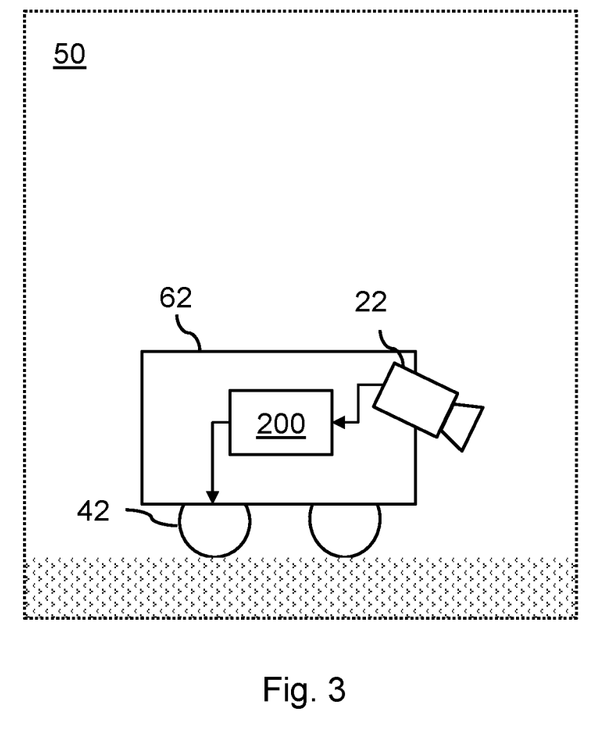
FIG. 3 shows the system for applying a machine learnable function as part of an (semi-) autonomous vehicle, in accordance with an example embodiment of the present invention.

FIG. 3 shows an example of the above, in that the system 200 is shown to be a control system of an (semi-)autonomous vehicle 62 operating in an environment 50. The autonomous vehicle 62 may be autonomous in that it may comprise an autonomous driving system or a driving assistant system, with the latter also being referred to as a semi-autonomous system. In this example, the input observations used by system 200 may be images of the environment of the vehicle. The difference labels used in training may indicate, for example, a difference in weather conditions and/or a difference in occlusion level and/or position and/or orientation of an object in the environment.

The autonomous vehicle 62 may for example incorporate the system 200 to control the steering and the braking of the autonomous vehicle based on sensor data obtained from a video camera 22 integrated into the vehicle 62. For example, the system 200 may control an electric motor 42 to perform (regenerative) braking in case the autonomous vehicle 62 is expected to collide with a traffic participant. The system 200 may control the steering and/or braking to avoid collision with the traffic participant. For that purpose, the system 200 may obtain an image of the traffic situation around the vehicle 62 from camera 22 and classify it according to whether or not the traffic situation is safe. If the traffic situation is considered unsafe, the system 200 may take corresponding action. Since images of unsafe traffic situations are typically hard to obtain, generalizability is particularly important when learning to recognize them.

Various embodiments of the present invention involve the use of a regularization objective to reward a machine learnable function for responding predictably, at a certain layer of the function, to a set of differences between input observations. In particular, this regularization objective may comprise the evaluation of a mutual information between representations of the input observations at that layer given a difference label between the input observations, and/or the evaluation of an interaction information between the representations and the difference label. These choices for the regularization objective are now justified from a mathematical point of view, in particular, with reference to the concept of equivariance as described in "Group Equivariant Convolutional Networks" by T. Cohen et al.

As described in the Cohen paper, for a mapping $\Phi$ which maps from one space to another, $\Phi: X \rightarrow Z$, a group element g in the group $\mathcal{G}$, and a group action •, a mapping $\Phi$ may be referred to as being $\mathcal{G}$-equivariant, or equivariant with respect to the action of group G, if the mapping and the transformation commute, i.e.: $\Phi(g \cdot x) = g \cdot \Phi(x)$. In particular, the mapping $\Phi$ may be referred to as being $\mathcal{G}$-invariant if the action of the transformation in $\mathcal{Z}$ space is the identity transformation, i.e.: $\Phi(g \cdot x) = \Phi(x)$. Accordingly, an equivariant map is an example of a map that responds predictably to known differences to its inputs, in particular, where the inputs relate to each other through the application of a known transformation of the input.

Interestingly, however, the inventors envisaged to define such predictability statistically, e.g., in terms of relations between random variables. This way, a more general definition is obtained, that is less rigid and that does not require transformation according to a group structure. This statistics-based definition of predictability may be referred to as "information-equivariance". This definition may be motivated as follows.

Using similar notation as for equivariance, denote an input observation to a machine learnable function by a random variable x in a space $\mathcal{X}$. Let random variable $\hat{x}$ denote a second input observation, and let random variable g denote a difference between x and $\hat{x}$. For example, in the setting of equivariance, g may be a group element sampled from $\mathcal{G}$, and $\hat{x}$ may be $\hat{x} = g \cdot x$, i.e., a transformed input observation defined as deterministic combination of g and $\hat{x}$ through the group action in space $\mathcal{X}$. Note that, if g is independent from x, then a sample from $\hat{x}$ may be regarded as another i.i.d. sample from $\mathcal{X}$. Given a stochastic or deterministic map $\Phi: \mathcal{X} \rightarrow Z$, the representations of the first and second input observations according to that map may be denoted as $z = \Phi(x)$ and $\hat{z} = \Phi(\hat{x})$, respectively. Here, z is a random variable; for example, if $\Phi$ is deterministic, its conditional distribution $P(z|x)$ is a point mass at $\Phi(x)$. Using this notation, predictability of how a mapping responds to differences between input observations may be defined in terms of the entropy $H(\hat{z}|z, g)$ of $\hat{z}$ conditioned on z and g: the smaller the entropy, the higher the predictability. In particular, it can be shown mathematically that $\mathcal{G}$-equivariance for a group $\mathcal{G}$ implies minimum conditional entropy.

Using known identities, the conditional mutual entropy may be decomposed as $H(\hat{z}|z, g) = H(\vec{z}|g) - I(\hat{z}; z|g) = H(\hat{z}) - I(\hat{z}; g) - I(\hat{z}; z|g) = H(\hat{z}) - I(\hat{z}; z|g)$, assuming that g is independent from x and z and thus shares no mutual information with them. Accordingly, instead of minimizing the conditional entropy, it is possible to instead maximize the conditional mutual information $I(\hat{z}; z|g)$ between the first and second representations z, $\hat{z}$ given the difference label g. This enables for example the use of mutual information estimation models, as described elsewhere. It is noted that, in the case of deterministic $\Phi$, the entropy of z (and $\hat{z}$) may be upper bounded by the entropy of x, and thus, such a maximization may also explicitly maximize the entropies of both z and $\hat{z}$ since their mutual information is only maximized when their individual entropies are maximized.

Further, it may be noted that a potential degenerate optimum is a map which is invariant to the differences indicated by g, e.g., $\Phi(g \cdot x) = \Phi(x)$. Although the maximization of the entropy of $\hat{z}$ may prevent this solution from becoming a global optimum, there is still a possibility of this solution being obtained as a local optimum, especially when estimating mutual information using a mutual information estimation model. Also because invariance is all that is required to solve various discriminative learning tasks, occurrence of this local optimum may be expected. This local optimum is however undesirable in terms of generalizability.

To discourage invariance in trained machine learnable functions, and thus to further improve generalizability, an additional term may be included in the regularization objective that discourages the mutual dependence between the first and second representations, unconditioned on the difference label. Specifically, the mutual information between $\hat{z}$ and z (not conditioned on g) may be minimized. For example, the following regularization objective may be used:

$$\max_{\Phi} I(\Phi(\hat{x}); \Phi(x) | g) - I(\Phi(x); \Phi(x)).$$

Interestingly, this regularization objective corresponds to the known statistical measure of interaction information between the variables $\Phi(\hat{x})$, $\Phi(x)$, and g. This measure essentially represents an amount of information is that is contained jointly in the three which is not contained in a subset of the two. By using this interaction information, an information-equivariant mapping may be obtained without an invariant solution, and z and ẑ may be rewarded to be independent.

Figure 4:
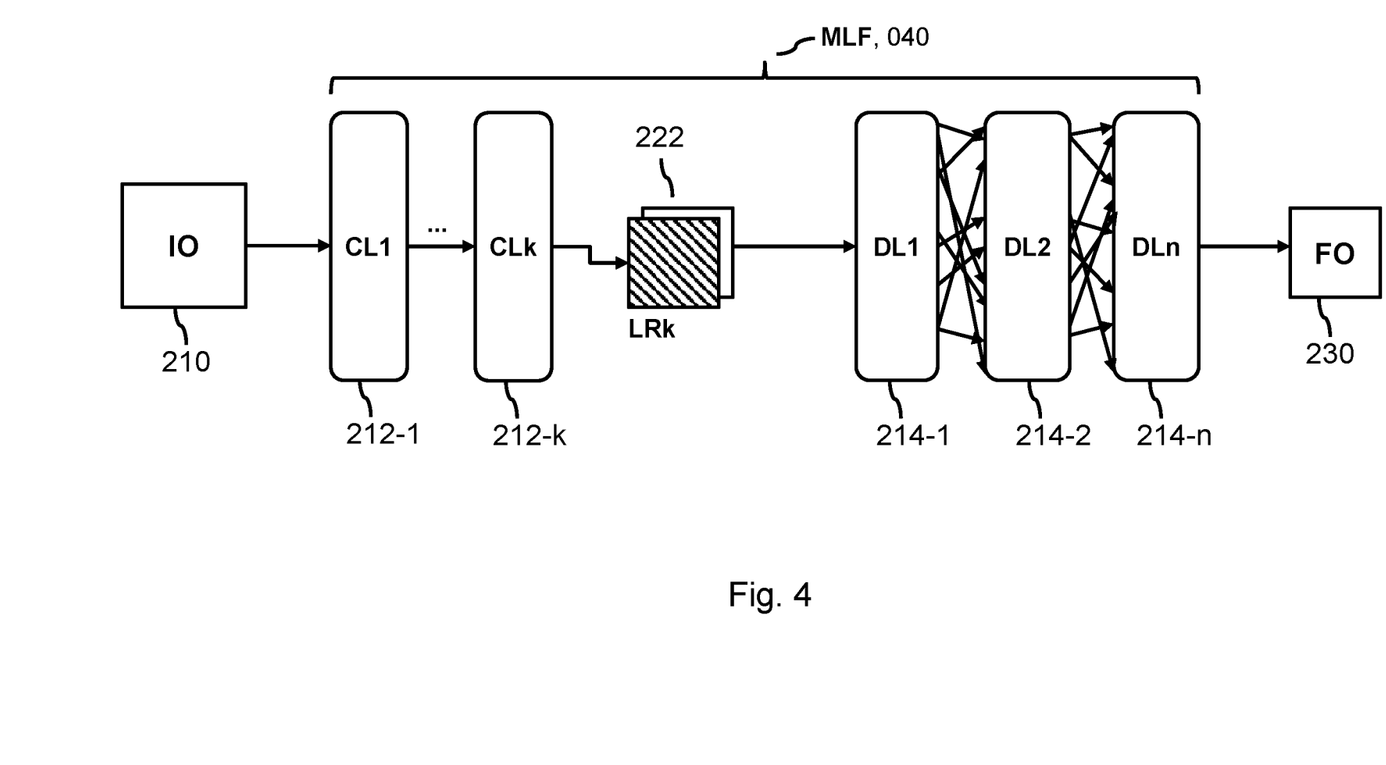
FIG. 4 shows a detailed example of a machine learnable convolutional network, in accordance with an example embodiment of the present invention.

FIG. 4 shows a detailed, yet non-limiting, example of a machine learnable function MLF, 040, in this case a convolutional network. Such a convolutional network is also referred to as a convolutional neural network (CNN). A convolutional network is a special type of neural network. Neural networks are also known as artificial neural networks. A neural network typically comprises multiple subsequent layers of nodes. The parameters of a neural network typically comprise weights of nodes of the neural network. For example, the number of layers of the network may be at least 5 or at least 10, and the number of nodes and/or weights may be at least 1000 or at least 10000.

Broadly speaking, a convolutional network is a neural network in which at least one layer is a convolutional layer, as discussed below. Various convolutional network architectures are conventional, including so-called fully convolutional networks, in which each layer of the network is a convolutional layer. This architecture is often used for semantic segmentation tasks in image classification, for example. Another conventional architecture is the one shown in the figure, in which the CNNs comprises two components: a convolutional part, comprising at least one convolutional layer, and a dense (e.g., fully-connected) part, comprising at least one dense layer. This architecture is often used for detection tasks in image classification, for example.

For the sake of illustration, it is now described how such a CNN may be used to obtain a function output FO, 230, for an input observation IO, 210. The input to a CNN is typically represented spatially, e.g., as a M×N×d-sized volume, where dimension d=1 is for example used for greyscale images and dimension d=3 is often used for color images. It is conventional to represent other types of data, e.g., audio data, as such a volume as well.

As shown in the figure, input observation IO may be input into the machine learnable function MLF, more specifically to a first layer CL1, 212-1 of filters (or in some cases, a single filter). Each of the filters may convolve over the input observation IO, together producing an activation volume, or "latent representation". Each "slice" of the activation volume may be the output of one of said filters. The latent representation may have a different size, e.g., spatial resolution, than the size M×N of the input observation IO. The latent representation may then be used as an input to subsequent layer, CL2, 212-2. The filter(s) of CL2 may then convolve over the latent representation output by the first layer CL1 to produce a second latent representation. This process may continue for further layers 212. Throughout this convolutional part of the CNN, the spatial relationship of latent representations to the input observation is typically preserved, although the spatial dimensions of latent representations may differ from one latent representation to another, and from the spatial dimensions of the input observation.

After the last layer CLk, 212-k of the convolutional part of the CNN (often referred to as the last convolutional layer, although in some embodiments the last layer CLk of the convolutional part may not necessarily be a convolutional layer, provided it preserves the spatial relationship as discussed above), the resulting latent representation LRk, 222, is in this example input into the first of the dense layers DL1, 214-1. The dense layers 214 may be fully-connected layers, in which the neurons of each fully-connected layer are connected to all of the neurons in another layer. After passing through the dense part of the CNN, a function output FO, e.g., a classification score or set of classification scores, may be output.

Figure 5A:
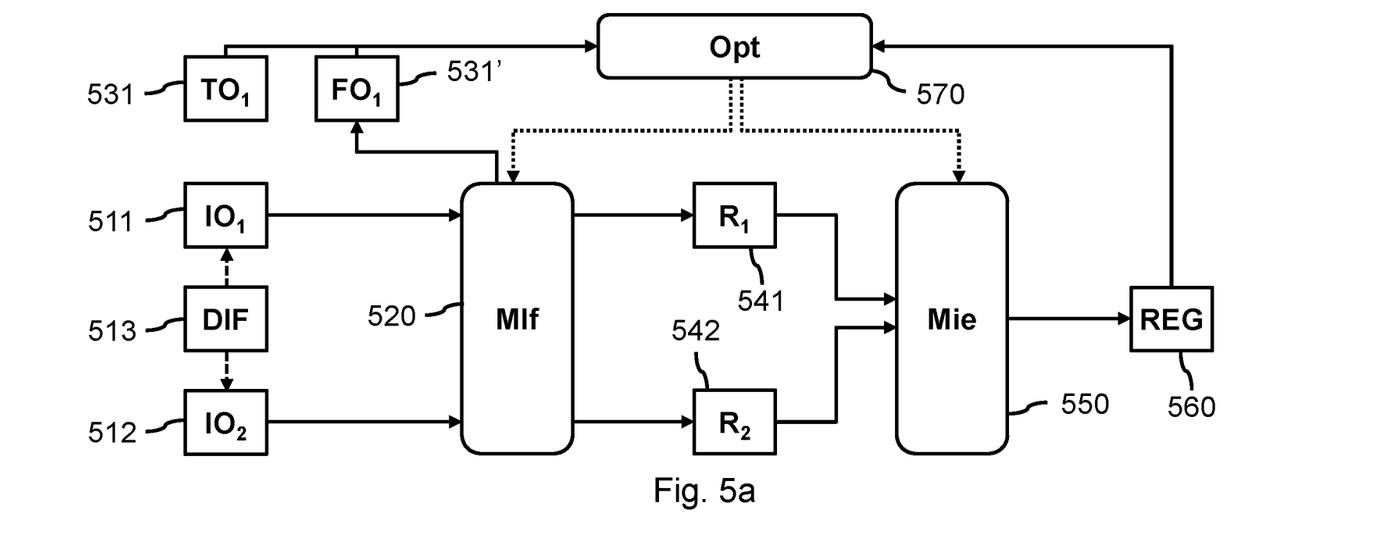
FIG. 5a shows a detailed example of training a machine learnable function using a regularization objective, in accordance with an example embodiment of the present invention.

FIG. 5a shows a detailed, yet non-limiting, example of training a machine learnable function using a regularization objective.

Shown is a machine learnable function Mlf, 520. The machine learnable function Mlf may map input observations to function outputs. Generally, the machine learnable function Mlf can be a deterministic function (e.g., a conventional neural network), but the function can also be stochastic (e.g., a Bayesian neural network).

For example, the input observations can be images or other types of sensor data represented as images, or sensor data represented in a different way. For example, an input observation can comprise a time series of (direct or indirect) measurements of a certain physical quantity, or multiple such time series. Various features are explained below for images but are applicable to other types of sensor data as well.

The function outputs can be of various types. For example, the function output can comprise an image classification output indicating whether an image, or one or more segments of the image, belongs to one or more given classes. The machine learnable function Mlf can be an image classifier, e.g., a detection model or a semantic segmentation model. For a detection model, the output can comprise one or more classification scores. For a semantic segmentation model, the output can comprise a similarly dimensioned classification output as the input representing, presence information for respective segments of the input image. The machine learnable function Mlf can also, e.g., be an image feature extractor, in which case the function output may be a vector of extracted features.

The function outputs of the machine learnable function Mlf are referred to herein as the "output layer" of the machine learnable function, and the function output as a representation of the input observation at the output layer. For example, the representation of an input observation at the output layer may comprise at least 10, at least 100, or at least 1000 features. The input observation can comprise at least 100, at least 1000, or at least 1000 features. In some embodiments, e.g., in an object detection model, the output representation has fewer features than the input observations; but the number of features and/or the spatial dimensions of the output representation can also be the same as that of the input observation, e.g., in case of a semantic segmentation model.

Apart from the output layer, the machine learnable function Mlf may have one or more internal layers. That is, evaluating the machine learnable function Mlf may comprise sequentially evaluating the one or more layers, the output of a previous layer being used as an input to the next layer. Machine learnable functions with layers include neural networks (in particular, deep neural networks), and deep Gaussian processes. For example, the machine learnable function Mlf may be a convolutional network, e.g., as described with respect to FIG. 4, in particular a fully convolutional network. It is not needed for machine learnable function Mlf to have a layered structure, however; for example, the machine learnable function can be a support vector machine or the like.

Machine learnable function Mlf may be parameterized by a set of parameters (not shown in the figure) that may be learned when training the machine learnable function. For example, the parameters can include neural network weights and the like. The number of parameters can be at least 1000 or at least 10000, for example.

The parameters may be learned, in an optimization operation Opt, 570, by optimizing an objective function. Various objective functions appropriate for respective learning tasks, e.g., classification, regression, feature extraction, auto-encoding, etc., are conventional, and can be used here. Conventional training techniques can be used, including iteratively optimizing the objective function. For example, stochastic optimization techniques such as stochastic gradient descent can be used, e.g., using the Adam optimizer as disclosed in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches, e.g., of at most or at least 64 or at most or at least 256 instances.

The figure illustrates supervised learning based on a training dataset of multiple input observations and corresponding training outputs. In this case, the objective function evaluated by optimization Opt typically includes a training loss to be minimized (sometimes referred to as the reconstruction loss), based on a difference between function outputs of the machine learnable function and the corresponding training outputs. Shown in the figure is an input observation IO1, 511, that is input to the machine learnable function to get a corresponding function output FO1, 531'. Optimization Opt may compare function output FO1 to a training output TO1, 531, for the input observation, and adjust the parameters of the machine learnable function Mlf based on the comparison. Optimization Opt may also perform unsupervised learning, in which case the machine learnable function is typically still applied to training instances but the objective function is not based on training outputs. Regardless of whether the training is supervised or unsupervised, the number of training input observations can be, for example, at least 1000, at least 10000, or at least 10000.

Interestingly, in order to reward the machine learnable function Mlf for responding predictably at a layer of the machine learnable function to a set of differences between input observations, a regularization objective Reg, 560, may be included in the objective function being optimized. The layer at which the regularization objective is applied, can be the output layer, or an internal layer. It is also possible to include multiple respective regularization objectives for multiple respective layers (e.g., an internal layer or the output layer) of the machine learnable function. For ease of explanation, a single regularization objective is discussed here: multiple regularization objectives may be implemented by repeating the described operations for each regularization objective used.

The regularization objective Reg may be defined in terms of the result of applying the machine learnable function to a pair of input observations IO1, 511 and IO2, 512, that differ according to a given difference label DIF, 513. Options for obtaining the pair IO1, IO2, and the corresponding difference label DIF are discussed elsewhere. The set of difference labels is typically chosen to be discrete, e.g., comprising at most or at least 5, at most or at least 10, or a most or at least 25 possible differences. However, in principle the use of continuous difference labels is possible as well. Given the input observations IO1 and IO2, the machine learnable function Mlf may be applied (at least in part) to get corresponding representations R1, 541, and R2, 542, of the input observations at the layer for which the regularization objective Reg is defined. Based on representations R1 and R2, and difference label DIF (typically, based on multiple such triples R1, R2, DIF), the regularization objective Reg may be evaluated.

The regularization objective REG may be configured to reward a mutual statistical dependence between the first representation R1 and second representation R2 given the difference label DIF. As described elsewhere, there are various options for defining this regularization objective, including by minimizing the conditional entropy of R2 given R1 and DIF, and by maximizing the mutual information of R1 and R2 given DIF, e.g., $I(\Phi(\hat{x}); \Phi(x)|g)$. The regularization objective REG may further discourage a mutual dependence between the first representation R1 and the second representation R2 unconditioned on the difference label DIF, for example, by minimizing a mutual information between R1 and R2 unconditioned on the difference label DIF, e.g., $I(\Phi(\hat{x}); \Phi(x))$. For example, the regularization objective may comprise the interaction information between R1, R2, and DIF, e.g., $I(\Phi(\hat{x}); \Phi(x)|g) - I(\Phi(\hat{x}); \Phi(x))$. It is also possible to weigh terms $I(\Phi(\hat{x}); \Phi(x)|g)$ and $I(\Phi(\hat{x}); \Phi(x))$ differently, e.g., according to a hyperparameter $\lambda$, e.g., $I(\Phi(\hat{x}); \Phi(x)|g) - \lambda \cdot I(\Phi(\hat{x}); \Phi(x))$.

In order to evaluate the regularization objective REG, various conventional techniques for computing or estimating the respective statistical quantities can be used. This figure however illustrates a regularization objective based on (conditional) mutual information, where the (conditional) mutual information is estimated according to a trainable mutual information estimation model Mie, 550. An example of such a trainable mutual information estimation model is disclosed in M. Belghazi et al., "MINE: Mutual Information Neural Estimation" (available at https://arxiv.org/abs/1801.04062 and incorporated herein by reference). Respective mutual information estimation models can be used to estimate the mutual information conditioned on the difference label DIF, e.g., $I(\Phi(\hat{x}); \Phi(x)|g)$; and unconditioned on the difference label, e.g., $I(\Phi(\hat{x}); \Phi(x))$. For the former, the techniques of MINE can be adapted to estimate conditional mutual information in a straightforward way by sampling from distributions conditioned on the difference label. Interestingly, the mutual information estimation model(s) may be optimized in optimization Opt simultaneously with the training of the machine learnable function Mlf, for example, based on a single objective function. This allows the mutual information estimation to be progressively adapted as the machine learnable function is updated.

It is noted that, in view of the mutual information identities $I(X;Y|Z) - I(X;Y) = I(X;Z|Y) - I(X;Z) = I(Y;Z|X) - I(Y;Z)$, the interaction information may also be estimated as $I(\Phi(\hat{x}); g|\Phi(x)) - I(\Phi(\hat{x}); g)$ or as $I(\Phi(x); g|\Phi(\hat{x})) - I(\Phi(x); g)$, for example, using mutual information estimation models as described above.

Figure 5B:
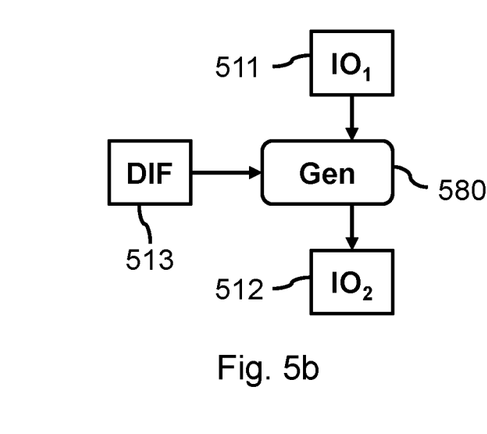
FIG. 5b shows a detailed example of generating a second input observation for use in training a machine learnable function, in accordance with an example embodiment of the present invention.

Proceeding now to how to obtain triples IO1, IO2, DIF of input observations and a corresponding difference label, several possibilities are envisaged. In some embodiments, such triples may be available as part of the training dataset. This may be referred to as the supervised setting. Another possibility, which is illustrated in FIG. 5b, is that input observation IO2 is generated from input observation IO1 and difference type DIF in a generation operation Gen, 580. This may be referred to as the self-supervised setting. Any generation operation Gen suitable for the application at hand may be used. Difference type DIF may indicate a transformation to be applied to input observation IO1, e.g., which can be a geometric transformation such as rotation and/or translation, but also a synthetic modification to input observation IO1 to modify properties of objects in a scene, or to modify observation conditions. For example, an image of an environment of a vehicle may be adapted to introduce snow or rain, to change a day scene to a night scene, etcetera.

A third option, not shown in the figures, is to determine the difference label DIF from the input observations IO1 and IO2 using a machine learnable labelling function. This function can be trained before performing optimization Opt, but learning this function simultaneously with the function Mlf (e.g., using multi-task learning) is generally preferred. The training of the labelling function can be supervised. E.g., in case difference labels are available for a subset of input observations, the labelling function can be learned on the subset and applied to pairs for which no label is available. Interestingly, the training can also be unsupervised, enabling to completely eliminate the labelling effort. For example, the labelling function may be trained as described in M. Caron et al., "Deep Clustering for Unsupervised Learning of Visual Features" (available at https://arxiv.org/abs/1807.05520 and incorporated herein by reference).

Figure 5C:
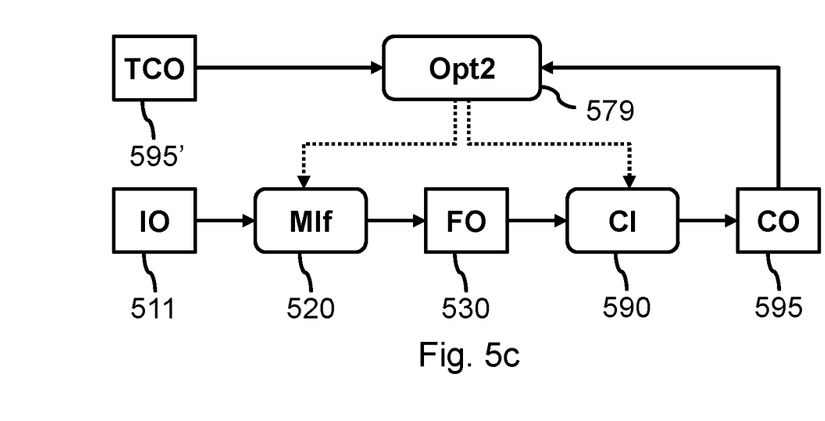
FIG. 5c shows a detailed example of training a machine learnable function, being an image feature extractor for use in an overall image classifier, in accordance with an example embodiment of the present invention.

FIG. 5c shows a detailed, yet non-limiting, example in which the machine learnable function being trained, is an image feature extractor for use in an overall image classifier CI, 590. That is, the overall image classifier CI may classify an input observation IO, e.g., an input image, by applying the machine learnable function Mlf to obtain a function output FO providing a vector of features extracted from the input observation IO; and by performing classification CI on the resulting extracted features FO using a further machine learnable function. In this case, to train the overall image classifier, the machine-learnable function can be first trained as described herein, without using classification labels. Thus, also input observations 10 for which no classification label is available, can be used.

Afterwards, in an optimization operation Opt2, 579, the overall image classifier may be trained on training examples 10 labelled with desired training classification outputs TCO, 595'. This optimization operation Opt2 at least learns the parameters of the further machine learnable function CI outputting the classification; optionally, optimization Opt2 may also fine-tune the machine-learnable function Mlf. To this end, optionally, the regularization objective Reg for the machine-learnable function Mlf may be included in the objective function for training the overall classifier.

FIG. 6 shows a block-diagram of computer-implemented method 600 of training a machine learnable function. The machine learnable function may map an input observation to a function output. The machine learnable function may comprise one or more internal layers and/or an output layer. The method 600 may correspond to an operation of the system 100 of FIG. 1. However, this is not a limitation, in that the method 600 may also be performed using another system, apparatus or device.

The method 600 may comprise, in an operation titled "ACCESS TRAINING DATA, PARAMETERS", accessing 610: a training dataset comprising multiple training input observations; and a set of parameters of the machine learnable function.

The method 600 may comprise, in an operation titled "LEARN PARAMETERS", learning 620 the set of parameters of the machine learnable function by optimizing an objective function. The optimization may comprise rewarding the machine learnable function for responding predictably at a layer of the machine learnable function to a set of differences between input observations. The optimization may reward said predictability by means of a regularization objective included in the objective function.

The optimization performed in learning operation 620 may comprise, in an operation titled "OBTAIN OBSERVATIONS, DIFFERENCE LABEL", obtaining 622: a first input observation from the training dataset; a corresponding second input observation; and a difference label from the set of differences indicating a difference between the first and second input observations. The optimization may further comprise, in an operation titled "APPLY FUNCTION TO DETERMINE REPRESENTATIONS", applying 624 the machine learnable function to determine first and second representations of the first and second input observations, respectively, at the layer of the machine learnable function. The optimization may further comprise, in an operation titled "REWARD DEPENDENCE OF REPRESENTATIONS GIVEN DIFFERENCE LABEL", evaluating 626 the regularization objective, wherein the regularization objective may be configured to reward a mutual statistical dependence between the first and second representations given the difference label between the first and second input observations.

It will be appreciated that, in general, the operations of method 600 of FIG. 6 may be performed in any suitable order, e.g., consecutively, simultaneously, or a combination thereof, subject to, where applicable, a particular order being necessitated, e.g., by input/output relations.

Figure 7:
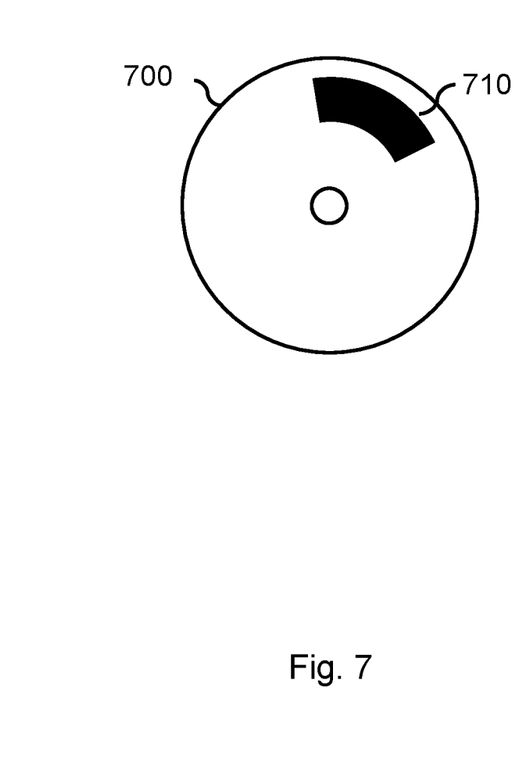
FIG. 7 shows a computer-readable medium comprising data, in accordance with an example embodiment of the present invention.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700. Alternatively, the computer readable medium 700 may comprise transitory or non-transitory data 710 representing a set of parameters of a machine learnable function trained by a computer-implemented method provided herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device enumerated by several means, several of these means may be embodied by one and the same item of hardware.

The mere fact that certain measures are described separately does not indicate that a combination of these measures cannot be used to advantage.

What is claimed is:

1. A computer-implemented method of training a machine learnable function, the machine learnable function mapping an input observation to a function output, the machine learnable function comprising one or more internal layers and/or an output layer, the method comprising the following steps:
   accessing a training dataset, including multiple training input observations, and a set of parameters of the machine learnable function;
   learning the set of parameters of the machine learnable function by optimizing an objective function, wherein the optimization includes rewarding the machine learnable function for responding predictably at a layer of the machine learnable function to a set of differences between input observations, the optimization rewarding the predictability using a regularization objective included in the objective function, the optimization including:
      obtaining: (i) a first input observation from the training dataset, (ii) a corresponding second input observation, and (iii) a difference label from the set of differences indicating a difference between the first and second input observations;
      applying the machine learnable function to determine first and second representations of the first and second input observations, respectively, at the layer of the machine learnable function;
      evaluating the regularization objective, wherein the regularization objective is configured to reward a mutual statistical dependence between the first and second representations given the difference label between the first and second input observations, wherein the evaluating of the regularization objective includes estimating a conditional mutual information based on the first and second representations and the difference label, and wherein the mutual information is estimated according to a trainable mutual information estimation model, and wherein the method further comprises training the mutual information estimation model simultaneously with the machine learnable function.

2. The method of claim 1, wherein the machine learnable function is an image classifier or an image feature extractor.

3. The method of claim 2, wherein the machine learnable function is an image feature extractor for use in an overall image classifier, the image feature extractor being trained on an unlabelled training dataset, and wherein the method further comprises training the overall image classifier on a labelled training dataset.

4. The method of claim 2, wherein the objective function includes multiple respective regularization objectives for multiple respective layers.

5. The method of claim 2, wherein the first and second input observations are images representing a same type of scene, the difference label indicating a difference of a property of an object in the scene and/or a difference in observation conditions of the scene.

6. The method of claim 5, wherein the first and second images represent an environment around a vehicle, and the difference label indicates at least one of the following:
   a difference in weather conditions, and/or
   a difference in occlusion level of an object in the environment, and/or
   a difference in position of an object in the environment, and/or
   a difference in orientation of an object in the environment.

7. The method of claim 1, wherein the machine learnable function is a convolutional network.

8. The method of claim 1, wherein the regularization objective is further configured to discourage a mutual dependence between the first and second representations unconditioned on the difference label.

9. The method of claim 1, further comprising generating the second input observation from the first input observation and the difference label.

10. The method of claim 1, further comprising determining the difference label by applying a machine learnable labelling function to the first and second input observations.

11. The method of claim 1, further comprising:
   obtaining, via a sensor interface, sensor data providing an observation of a computer-controlled system and/or its environment;
   applying the machine learnable function to the observation; and
   monitoring and/or controlling the computer-controlled system based on the output of the machine learnable function.

12. A system for training a machine learnable function, the machine learnable function mapping an input observation to a function output, the machine learnable function including one or more internal layers and/or an output layer, the system comprising:
   a data interface configured to access a training dataset, including multiple training input observations, and a set of parameters of the machine learnable function;
   a processor subsystem configured to learn the set of parameters of the machine learnable function by optimizing an objective function, wherein the optimization includes rewarding the machine learnable function for responding predictably at a layer of the machine learnable function to a set of differences between input observations, the optimization rewarding the predictability by means of a regularization objective included in the objective function, the optimization including:
      obtaining: (i) a first input observation from the training dataset, (ii) a corresponding second input observation, and (iii) a difference label from the set of differences indicating a difference between the first and second input observations;
      applying the machine learnable function to determine first and second representations of the first and second input observations, respectively, at the layer of the machine learnable function;
      evaluating the regularization objective, wherein the regularization objective is configured to reward a mutual statistical dependence between the first and second representations given the difference label between the first and second input observations, wherein the evaluating of the regularization objective includes estimating a conditional mutual information based on the first and second representations and the difference label, and wherein the mutual information is estimated according to a trainable mutual information estimation model, and wherein the method further comprises training the mutual information estimation model simultaneously with the machine learnable function.

13. A non-transitory computer-readable medium on which is stored data representing instructions for training a machine learnable function, the machine learnable function mapping an input observation to a function output, the machine learnable function comprising one or more internal layers and/or an output layer, the instructions, when executed by a computer, causing the computer to perform the following steps:

accessing a training dataset, including multiple training input observations, and a set of parameters of the machine learnable function;

learning the set of parameters of the machine learnable function by optimizing an objective function, wherein the optimization includes rewarding the machine learnable function for responding predictably at a layer of the machine learnable function to a set of differences between input observations, the optimization rewarding the predictability using a regularization objective included in the objective function, the optimization including:

obtaining: (i) a first input observation from the training dataset, (ii) a corresponding second input observation, and (iii) a difference label from the set of differences indicating a difference between the first and second input observations;

applying the machine learnable function to determine first and second representations of the first and second input observations, respectively, at the layer of the machine learnable function;

evaluating the regularization objective, wherein the regularization objective is configured to reward a mutual statistical dependence between the first and second representations given the difference label between the first and second input observations, wherein the evaluating of the regularization objective includes estimating a conditional mutual information based on the first and second representations and the difference label, and wherein the mutual information is estimated according to a trainable mutual information estimation model, and wherein the method further comprises training the mutual information estimation model simultaneously with the machine learnable function.

\* \* \* \* \*